(12) United States Patent
Meylan et al.

(10) Patent No.: US 7,720,043 B2
(45) Date of Patent: May 18, 2010

(54) USE OF IDLE FRAMES FOR EARLY TRANSMISSION OF NEGATIVE ACKNOWLEDGEMENT OF FRAME RECEIPT

(75) Inventors: Arnaud Meylan, Oulens (CH); Sai Yiu Duncan Ho, San Diego, CA (US); Yongbin Wei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1322 days.

(21) Appl. No.: 10/301,448

(22) Filed: Nov. 20, 2002

(65) Prior Publication Data

US 2004/0095964 A1 May 20, 2004

(51) Int. Cl.
*H04J 3/00* (2006.01)
*H04W 4/00* (2009.01)
*H04B 1/00* (2006.01)
*G08C 25/02* (2006.01)

(52) U.S. Cl. ............... 370/345; 370/282; 370/324; 370/329; 370/403; 370/468; 455/69; 455/424; 455/458; 455/522; 714/748

(58) Field of Classification Search ......... 370/282–506, 370/508; 455/69, 424–522; 714/748
See application file for complete search history.

(56) References Cited

U.S. PATENT DOCUMENTS

| 5,410,536 | A |   | 4/1995  | Shah et al. |
|-----------|---|---|---------|-------------|
| 5,666,348 | A | * | 9/1997  | Thornberg et al. ......... 370/230 |
| 5,742,588 | A | * | 4/1998  | Thornberg et al. ......... 370/236 |
| 6,076,181 | A | * | 6/2000  | Cheng ..................... 714/748 |
| 6,097,700 | A | * | 8/2000  | Thornberg et al. ......... 370/233 |
| 6,169,732 | B1| * | 1/2001  | Hetherington et al. ...... 370/335 |
| 6,189,122 | B1| * | 2/2001  | Cheng ..................... 714/748 |
| 6,208,620 | B1| * | 3/2001  | Sen et al. ................. 370/231 |
| 6,542,490 | B1| * | 4/2003  | Ahmadvand et al. ........ 370/338 |
| 6,581,176 | B1| * | 6/2003  | Seo ........................ 714/749 |
| 6,618,375 | B2| * | 9/2003  | Rezaiifar et al. ........... 370/394 |
| 6,665,313 | B1| * | 12/2003 | Chang et al. .............. 370/469 |
| 6,757,270 | B1| * | 6/2004  | Kumar et al. .............. 370/342 |

(Continued)

FOREIGN PATENT DOCUMENTS

JP          62-239737          10/1987

(Continued)

OTHER PUBLICATIONS

Gong, F. et al. "An Application-Oriented Error Control Scheme for High-Speed Networks," *IEEE/ACM Transaction on Networking*, vol. 4, No. 5, Oct. 1, 1996.

(Continued)

*Primary Examiner*—Ayaz R Sheikh
*Assistant Examiner*—Venkatesh Haliyur
(74) *Attorney, Agent, or Firm*—Dang M. Vo (57) ABSTRACT

A group of data frames from a plurality of communication channels is received. At least one idle frame including a sequence number of a last frame in the group of data frames is then received. A delay period of time is allowed to elapse after receiving the idle frame before sending a negative acknowledgement message, if at least one data frame is missing.

16 Claims, 9 Drawing Sheets

U.S. PATENT DOCUMENTS

| | | | |
|---|---|---|---|
| 6,781,971 B1* | 8/2004 | Davis et al. | 370/329 |
| 6,850,508 B1* | 2/2005 | Chang et al. | 370/335 |
| 6,895,010 B1* | 5/2005 | Chang et al. | 370/394 |
| 6,917,608 B1* | 7/2005 | Weigand | 370/347 |
| 6,956,855 B1* | 10/2005 | Chang | 370/394 |
| 6,975,611 B1* | 12/2005 | Balachandran et al. | 370/337 |
| 7,031,741 B2* | 4/2006 | Lee et al. | 455/522 |
| 7,054,316 B2* | 5/2006 | Cheng et al. | 370/394 |
| 7,061,913 B1* | 6/2006 | Abrol et al. | 370/394 |
| 7,158,495 B2* | 1/2007 | Jei | 370/329 |
| 7,363,048 B2* | 4/2008 | Cheng et al. | 455/517 |
| 2002/0176362 A1* | 11/2002 | Yun et al. | 370/236 |
| 2003/0128716 A1* | 7/2003 | Harris et al. | 370/450 |
| 2003/0169723 A1* | 9/2003 | Diachina et al. | 370/349 |
| 2003/0169740 A1* | 9/2003 | Harris et al. | 370/394 |
| 2004/0013102 A1* | 1/2004 | Fong et al. | 370/345 |
| 2004/0013103 A1* | 1/2004 | Zhang et al. | 370/345 |
| 2004/0018846 A1* | 1/2004 | Cheng et al. | 455/458 |
| 2006/0072520 A1* | 4/2006 | Chitrapu et al. | 370/337 |
| 2006/0142045 A1* | 6/2006 | Lee et al. | 455/522 |

FOREIGN PATENT DOCUMENTS

| | | |
|---|---|---|
| JP | 2001-127829 | 5/2001 |
| WO | 0215434 | 2/2002 |

OTHER PUBLICATIONS

International Search Report - PCT/US03/036832 - ISA/EPO - May 26, 2004.

International Preliminary Examination Report - PCT/US/036832 - IPEA/US - Sep. 21, 2007.

* cited by examiner

USE OF IDLE FRAMES FOR EARLY TRANSMISSION OF NEGATIVE ACKNOWLEDGEMENT OF FRAME RECEIPT

BACKGROUND

1. Field

The present invention relates generally to communication systems, and more specifically to frame receipt negative acknowledgements in such systems.

2. Background

Data Services for third-generation (3G) systems, including both code-division multiple access 2000 (cdma2000) and wideband code-division multiple access (WCDMA), were designed around a physical layer framework that was optimized for voice transport. While 3G systems are designed to handle both services, voice services in particular are characterized by symmetric traffic loading (between the forward link and the reverse link) and guaranteed quality of service (for parameters such as latency, delay, etc.). Packet data services, however, are characterized by possibly asymmetric traffic loading that involves short messages (e.g., requests for data) of low bandwidth demand and very long messages (e.g., data downloads) of high bandwidth demand. There are some types of data traffic that are bursty, not all are (e.g., video).

To increase the likelihood that a frame will be successfully transmitted during a data transmission a system may employ a Radio Link Protocol (RLP) to track the frames transmitted successfully, and to perform frame retransmission when a frame is not transmitted successfully. Retransmission is performed up to a predetermined number of times, and it is the responsibility of the higher layer protocols to take additional steps to ensure that the frame is successfully transmitted. If the system sends the packets in an out-of-order sequence, the receiver is not readily able to distinguish if the packet is lossed or will be received at a later time. Such determination and waiting incurs processing time at the receiver, latency between the transmitter and receiver, as well as additional storage capacity at both the receiver and transmitter. Some systems incur a specific delay period that may prolong each communication.

There is therefore a need for a modified technique to more efficiently detect if a frame is lost so that a negative acknowledge message may be transmitted.

SUMMARY

The present invention overcomes the above-described shortcomings by using idle frames of the telecommunication system to better detect a lost data transmission and to enable an early transmission of a negative acknowledgement (NAK) message. An idle frame is a type of message that indicates that there are no more frames to be transmitted in the RLP buffer.

In one aspect, a group of data frames from a plurality of communication channels is received. Furthermore, at least one idle frame including a sequence number of a last frame in the group of data frames is received, and a delay period of time is allowed to elapse after receiving the idle frame before sending a negative acknowledgement message, if at least one data frame is missing. In an alternative implementation, a number of frames in the group of data frames may be included in the idle frame in place of the sequence number of the last frame.

In one embodiment, the delay period of time is determined by a timer, which is set to a time value that is smaller than a value set for DDW. In another embodiment, the delay period of time is determined by a data frame counter, which is set to a count that is smaller than a count set for DDC. In a further embodiment, the NAK message is transmitted immediately upon receipt of the idle frame if a parameter in the idle frame indicates that buffers in all sub-channels of the physical layer do not contain data for that RLP instance.

In another aspect, a wireless communication system is disclosed and described. The system supports communication from a transmitter to a receiver over a transmission medium including a plurality of packet data channels. The transmitter is configured to transmit a group of data frames comprising a data transmission through the plurality of packet data channels. Each data frame of the group of data frames is placed on a first available channel of the plurality of packet data channels. The transmitter is also configured to transmit at least one idle frame following the last data frame of a data transmission such that the idle frame includes a sequence number of a last frame in the group of data frames. The receiver is configured to receive the group of data frames and at least one idle frame, and to wait for a delay period of time after receiving the idle frame before sending a negative acknowledgement message, if at least one data frame is missing.

Other features and advantages of the present invention should be apparent from the following description of the preferred embodiments, which illustrates, by way of example, the principles of the invention.

DETAILED DESCRIPTION

The detailed description set forth below in connection with the appended drawings is intended as a description of embodiments of the present invention and is not intended to represent the only embodiments in which the present invention may be practiced. The word "exemplary" is used herein to mean "serving as an example, instance, or illustration." Any embodiment described herein as "exemplary" is not necessarily to be construed as preferred or advantageous over other embodiments.

Third-Generation Partnership Project 2 (3GPP2) has adopted an evolutionary approach to the existing cdma2000 standard, known as 1x evolution for data and voice (1xEV-DV), that is designed to provide an air interface for packet data applications such as wireless Internet. The 1xEV-DV forward link includes a pilot channel, a Packet Data Control Channel (PDCCH), a forward traffic channel, and a control channel. The traffic channel carries user data packets. The control channel carries control messages and may carry user traffic. These channels may be multiplexed, such as code division multiplex or time division multiplex, in order to support accurate pilot-based signal-to-interference-and-noise ratio (SINR) measurements at the mobile, to support full power transmission of the traffic channel to a single mobile, and to support code division multiplexing of the low data-rate MAC channels.

One of the best-known protocols used by the Internet is the Transport Control Protocol (TCP), which has proven to be an adequate data transport mechanism providing connection-oriented, reliable data service. However, errors in wireless channels tend to be frequent and are quite "bursty". Packets may be lost due to data traffic collisions (congestions) and also due to non-congestion related errors. TCP, however, invokes congestion control measures, assuming that each packet loss is solely due to congestion. It has been shown that interpreting the packet loss as a sign of congestion results in a degradation of TCP throughput. To overcome this degrading effect, wireless systems may employ a link layer protocol such as a Radio Link Protocol (RLP), which hides the majority of channel errors from TCP, by employing link layer retransmissions. However, if channel quality degenerates, leading to excessive retransmissions at the link layer, Internet Protocol (IP) packet round trip times will increase, possibly causing the TCP transmission to time out.

In accordance with the Telecommunications Industry Association/Electronics Industries Alliance (TIA/EIA) Interim Standard IS-707-A-2.10 (hereinafter referred to as IS-707), "Data Service Options for Spread Spectrum Systems: Radio Link Protocol Type 3", January 2000, the data exchanged between a wireless terminal and a base station is processed in frames that comprise data packets. To increase the likelihood that a frame will be successfully transmitted during a data transmission, IS-707 employs a Radio Link Protocol (RLP) to track the frames transmitted successfully, and to perform frame retransmission when a frame is not transmitted successfully. Retransmission is performed up to a predetermined integer number of times, such as designated by NAK ROUNDS, in IS-707, and it is the responsibility of the higher layer protocols to take additional steps to ensure that the frame is successfully transmitted.

Figure 1:
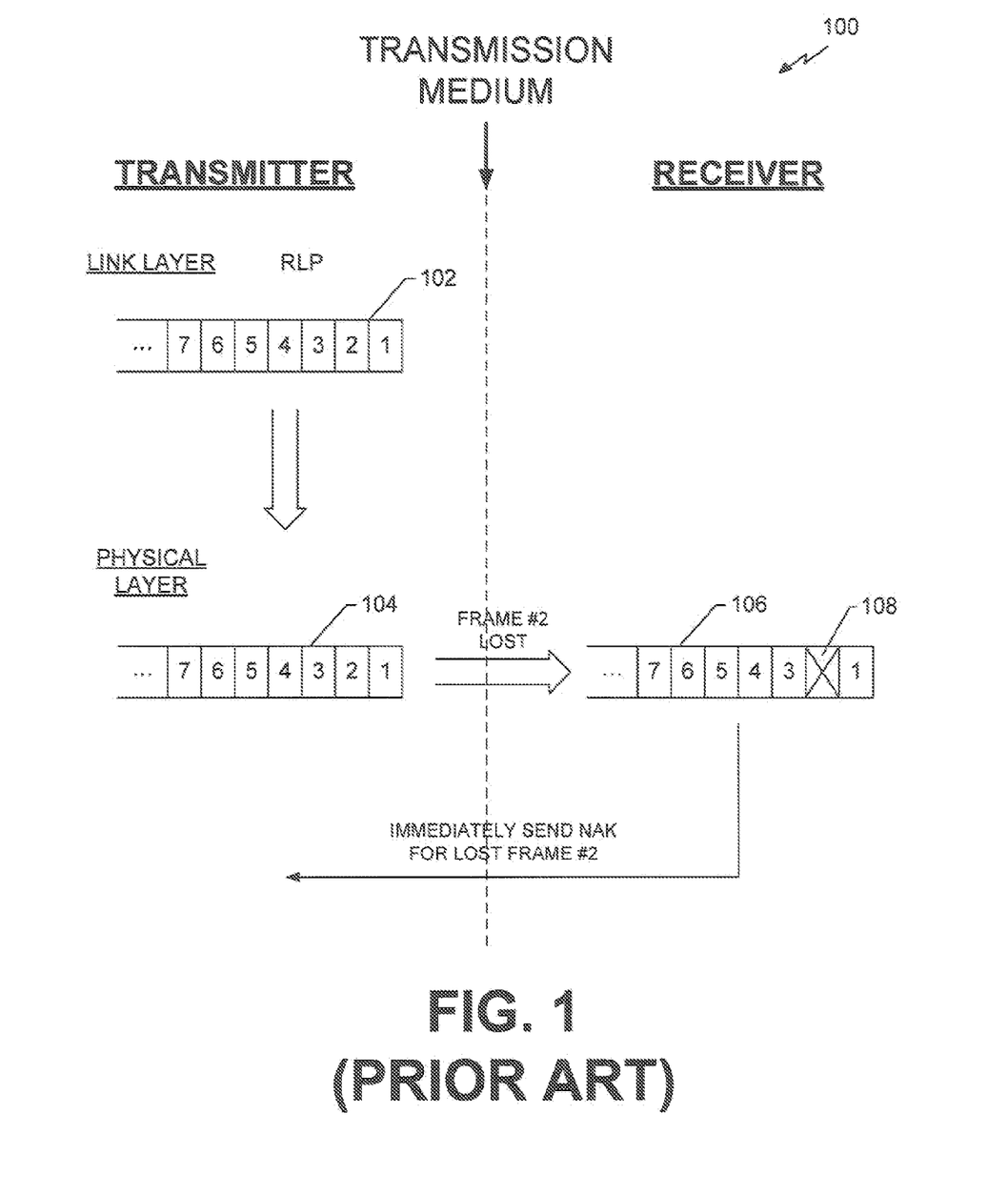
FIG. 1 illustrates a typical conventional air interface for a packet data application such as wireless Internet.

FIG. 1 illustrates a typical conventional air interface 100 for a packet data application such as the so-called "wireless Internet." The interface 100 includes a Transmitter having a link layer, such as RLP, and a physical layer. The link layer generates data frames 102 and transfers the frames to the physical layer, which assembles the frames into a data packet 104 for transmission across the wireless channel to a Receiver.

In order to track which frames have been transmitted successfully, IS-707 calls for an eight-bit sequence number to be included as a frame header in each frame transmitted. Alternate embodiments may implement this information in another format, such as by use of a different number of bits, or by placing the information at a different location in the frame. The sequence number is determined for each frame from 0 to 255 and then reset back to zero. An unsuccessfully transmitted frame is detected when a frame with a larger sequence number is received. The transmitter then retransmits the Radio Link Protocol (RLP) frame including the sequence number as originally transmitted. Note that the CRC is applied to frames on the physical layer, wherein the Radio Link Protocol (RLP) layer frames are successfully decoded frames. If the retransmitted frame is not received successfully, a second negative-acknowledgment message is sent to the transmitter, and so on until the maximal number of NAK rounds is reached. In this way, data transmission may begin with an initial first round and continue through a second round retransmission, a third round retransmission, and so forth, up to a system limit.

For example, in one embodiment, the interface 100 shown in FIG. 1, the content associated with Frame 2 has been lost in the transmission medium during transmission, where the number "2" represents the aforementioned sequence number included as a frame header. When the Receiver receives the transmitted frames of the data packet 104, and re-assembles the frames into a new data packet 106, it is apparent that the content associated with Frame 2 (position 108) is missing. Furthermore, the Receiver detects that content associated with Frame 2 (position 108) will not be received in the future because the Receiver has already received subsequent frames (e.g. Frames 3-7). Accordingly, the Receiver will immediately send a NAK message to the Transmitter to request a retransmission of content associated with Frame 2 (position 108).

Since the original development of IS-707, however, additional protocols and standards have been proposed and developed that allow data to be transmitted at greater rates. Note that 1xEV-DV is one of the standards that provides an evolutionary improvement of speed in the delivery of data across the transmission medium by using a Packet Data Channel (PDCH) in the physical layer. A transmitter in the PDCH provides multiple sub-channels for high speed delivery of the data from the transmitter to one or more receivers.

Figure 2:
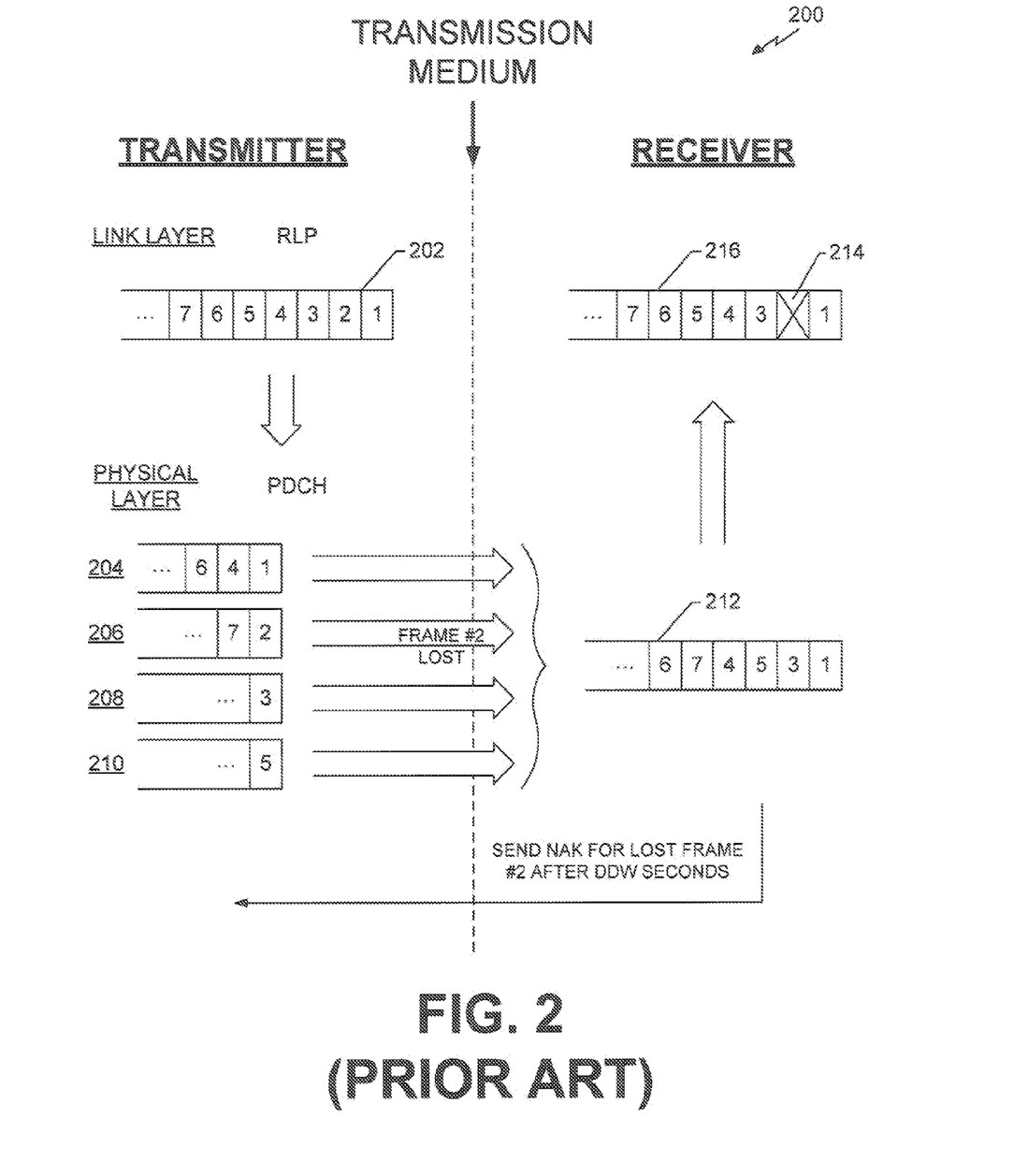
FIG. 2 illustrates a typical conventional air interface for a packet data application using PDCH in the physical layer.

FIG. 2 illustrates a typical conventional air interface 200 for a packet data application using PDCH in the physical layer. The interface 200 includes a Transmitter having a link layer, such as RLP, and a physical layer, such as a PDCH. The link layer generates the frames 202 and transfers the frames to the PDCH, which assembles the frames 202 into a series of data sub-packets 204, 206, 208, 210 for transmission across sub-channels of the wireless channel, through a transmission medium to a Receiver. In practice, the PDCH may include at least two sub-channels, and may include up to a maximum of four sub-channels. After an encoder packet is transmitted over a sub-channel, the transmitter waits for an acknowledgement from the receiver. If the transmitter receives a positive acknowledgement, it considers that the encoder packet is delivered successfully. Otherwise, the transmitter retransmits the encoder packet on the same sub-channel. Each transmission of an encoder packet is called a sub-packet and carries a sub-packet identifier. The procedure continues until the transmitter receives a positive acknowledgement or a predetermined maximum retransmission number is reached.

Since there is more than one available PDCH sub-channel, the sequential frames are transmitted on any available sub-channel, and each encoder packet could be transmitted multiple times, the frames may be received out of order. Thus, in the interface 200 of FIG. 2, Frames 1, 4, and 6 of the sub-packet 204 are transmitted on Sub-channel 1; Frames 2 and 7 of the sub-packet 206 are transmitted on Sub-channel 2; Frame 3 of the sub-packet 208 is transmitted on Sub-channel 3; and Frame 5 of the sub-packet 210 is transmitted on Sub-channel 4. In this example, the content associated with Frame 2 is lost in the transmission. The out of order delivery is due to the fact that transmitting a packet at the physical layer takes a variable time. Some frames go through faster than others When the Receiver receives the transmitted frames of the sub-packets 204, 206, 208, 210 into a data packet 212 on the receiving side, the frames are received out of order, for example, as Frames 1, 3, 5, 4, 7, and 6. Even after the frames are re-arranged into another data packet 216, it is not so apparent whether missing content associated with Frame 2 (position 214) has been lost or is being retransmitted and will be received at some future point in time. Although a NAK message may be sent to the Transmitter immediately to have the content associated with Frame 2 retransmitted, it is undesirable to send the NAK message on a missing frame that may still be in the process of being transmitted, because duplicate transmission of packets leads to waste of system resources and bandwidth. Such NAK are called premature NAK. Thus, it is most efficient to send a NAK message only in the circumstances that a frame has been irretrievably lost.

Consequently, a proposed modification to IS-707 provides that a wireless system should wait for a pre-defined period of time (a constant interval termed as a DELAY_DETECTION_WINDOW (DDW)) before transmitting a NAK message for retransmission of the missing frame. This pre-defined period of time, the DDW, is typically set between approximately 100 milliseconds and 1 second, to accommodate the possible scheduling delays for multiple users using the PDCH. However, a delay between 100 milliseconds and 1 second is a relatively long delay for a telecommunication system, and may result in unnecessary delay. Although an unnecessary NAK message should be avoided, it is also true that the Receiver may not possibly receive the retransmission of a missing frame until a NAK message is sent to the Transmitter. Therefore the NAK should be sent as soon as possible, while still giving the guarantee of not being premature.

Although the description is explained in the context of a "3G" telecommunication standard, it should be understood that the invention may be implemented in telecommunication systems that operate according to other standards.

In recognition of the above-stated problems associated with a conventional air interface for a packet data application using a Packet Data Channel (PDCH) in the physical layer, this description describes embodiments for a technique that uses idle frames to enable early transmission of a negative acknowledgement (NAK) message. In particular, the technique enables a receiver operating on the PDCH to transmit a NAK message earlier than the pre-defined period of time for a delay detection window (DDW) after detecting that a frame is missing from a data transmission. The technique is useful when the data traffic between the transmitter and the receiver is "bursty" (i.e. the data is transmitted in blocks of data followed by periods of no data traffic). However, the technique may be applied to other types of traffic wherein messages indicating the sequence numbers of the last frames of a data transmission are indicated. In a further embodiment, a parameter that indicates that the physical layer buffers for all sub-channels (up to a maximum of four) do not contain data for that particular service may be used to enable the receiver to immediately send the NAK message without having to wait for possible receipt of the missing frame, because the parameter indicates that no more frames are being transmitted on any sub-channel. The empty buffer parameter enables the application to generally obtain a smaller average Radio Link Protocol (RLP) packet delay. Consequently, for purposes of illustration and not for purposes of limitation, the embodiments of the invention are described in a manner consistent with such use, though the invention is not so limited.

Although it was indicated above that the receiver operating on the PDCH should wait for a pre-defined period of time (a constant termed as DELAY_DETECTION_WINDOW (DDW)) before transmitting a NAK message for retransmission of the missing frame(s) (hereinafter referred to as a DDW implementation), and that this configuration has been proposed as a modification to IS-707, it has been recognized that by using the limitations placed on the physical layer, the receiver may operate on the PDCH to transmit the NAK message earlier than the lapse of the pre-defined period of time (DDW).

For example, by using the fact that the maximum number of sub-channels allowed for the PDCH is four, and that a maximum of eight retransmission requests can be issued for each encoder packet, the receiver can include a counter that counts the number of received sub-packets up to a predetermined maximum (e.g. DELAY_DETECTION_COUNTER (DDC)). When the count reaches the maximum (e.g. 32) without the receiver receiving the missing frame, the receiver can determine with a very high probability (almost 100%) that the missing frame is irretrievably lost. Furthermore, it can be determined with a sufficiently high probability (somewhat less than 100%) that the missing frame is probably irretrievably lost by statistically adjusting the value for the DDC (e.g. to 8), and immediately sending the NAK message once the counter reaches that adjusted DDC value (hereinafter referred to as a DDC implementation).

In one implementation having at most 4 PL retransmissions per packet and 4 subchannels, it was determined that the DDC count of eight will provide a sufficiently high probability (in one example greater than 85%) that the missing frame has been lost and may not be retrieved, and that a NAK message may be sent earlier than the pre-defined period of time (DDW) to request a retransmission. Therefore, in most code-division multiple access (CDMA) systems, the DDC count will allow the receiver to send the NAK message without waiting for the full pre-defined period of time (DDW).

Figure 3:
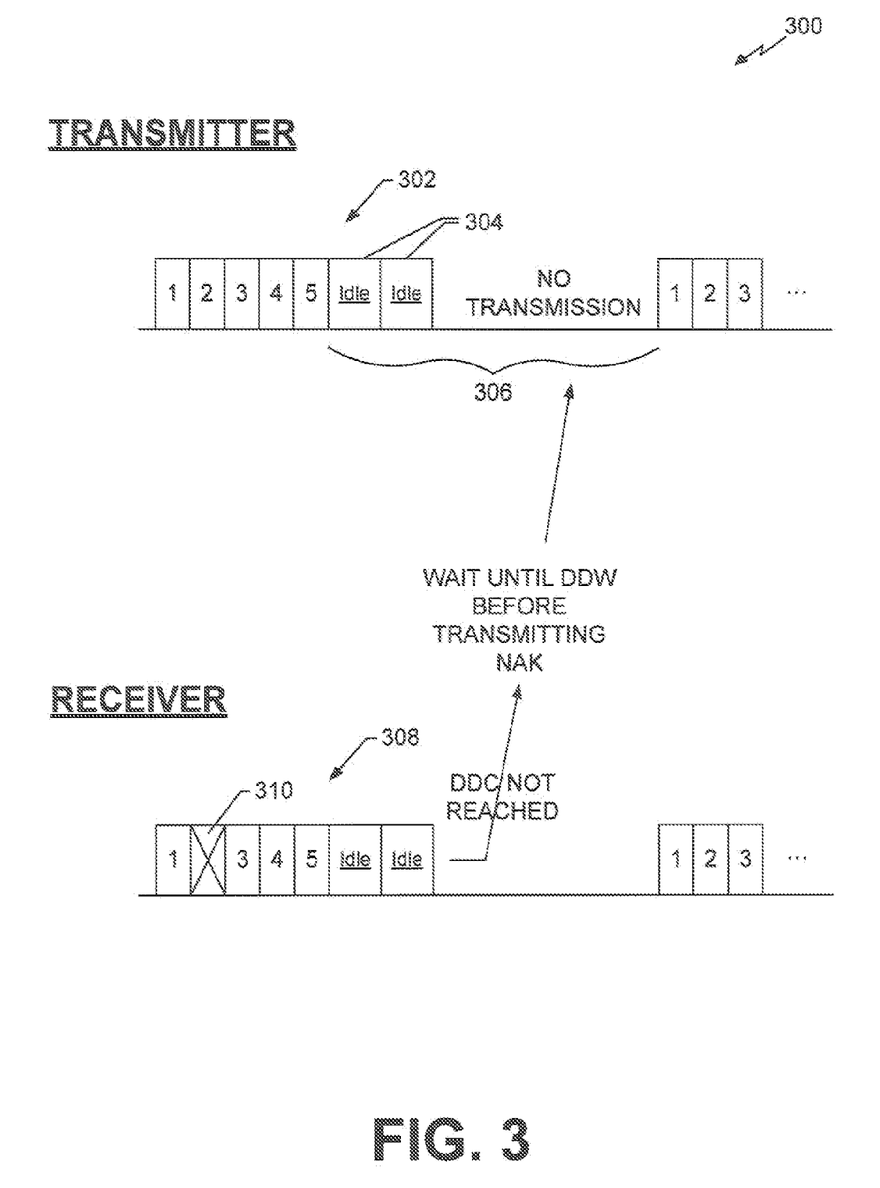
FIG. 3 illustrates one embodiment of the air interface for a packet data application using a DDC implementation.

FIG. 3 illustrates one embodiment of the air interface 300 for a packet data application using a DDC implementation. In one embodiment, the data traffic between the transmitter and the receiver is characterized by asymmetric data demands, such that data received is "bursty" (i.e. the data is transmitted in groups of short messages followed by relatively long periods of no data traffic). This type of "bursty" data traffic is common to Internet browsing, where a page is downloaded in a matter of milliseconds and then viewed for an extended time period before another page is requested. So there may be relatively long periods of not receiving any packets at all. In this type of situation, counting the number of received frames to identify lost data may not be too efficient or desirable.

For example, in FIG. 3, the data packet 302 in the transmitter side has five RLP frames to be transmitted followed by a relatively long period 306 of no data transmission. Thus, the Transmitter will generate at least one frame referred to as an RLP idle frame 304 and will append the idle frame to the end of the data packet 302. The transmission of the idle frame 304 indicates that there are no more frames in the RLP buffer to be transmitted.

Although IS-707 does not specify the use of idle frames for Radio Link Protocol (RLP) over the PDCH, it should be apparent to one skilled in the art that an RLP idle frame similar to the "Idle" frame specified in IS-707 may be formatted to be used over the PDCH. Typically, the idle frame contains no information bits in the data field (that is, no payload).

In one embodiment, when the data packet 302 is transmitted through the transmission medium, the content associated with Frame 2 (position 310) is lost. Thus, when the data packet 308 is received on the receiver side, the Receiver recognizes that, the content associated with Frame 2 (position 310) has not yet been received. However, the Receiver will not recognize that there are only five frames in the data packet because the idle frame may be transmitted on any sub-channel, and thus, there would be no way to ensure that other non-idle frames will be received on sub-channels other than the sub-channel in which the idle frame was received. The receipt of the idle frame may be used to trigger a delay detection counter. Therefore, in one embodiment, once the idle frame has been received, the delay detection counter in the Receiver counts received frames up to four and waits for the count to reach the value of the DDC (e.g. eight). However, in one embodiment, the count does not reach the value of the DDC before the DDW times out, because there were not enough frames in the data packet 308 to reach the DDC count value. Accordingly, the DDC implementation of one embodiment may not provide a desirable outcome of enabling an early transmission of a NAK message when the data traffic is "bursty".

Figure 4:
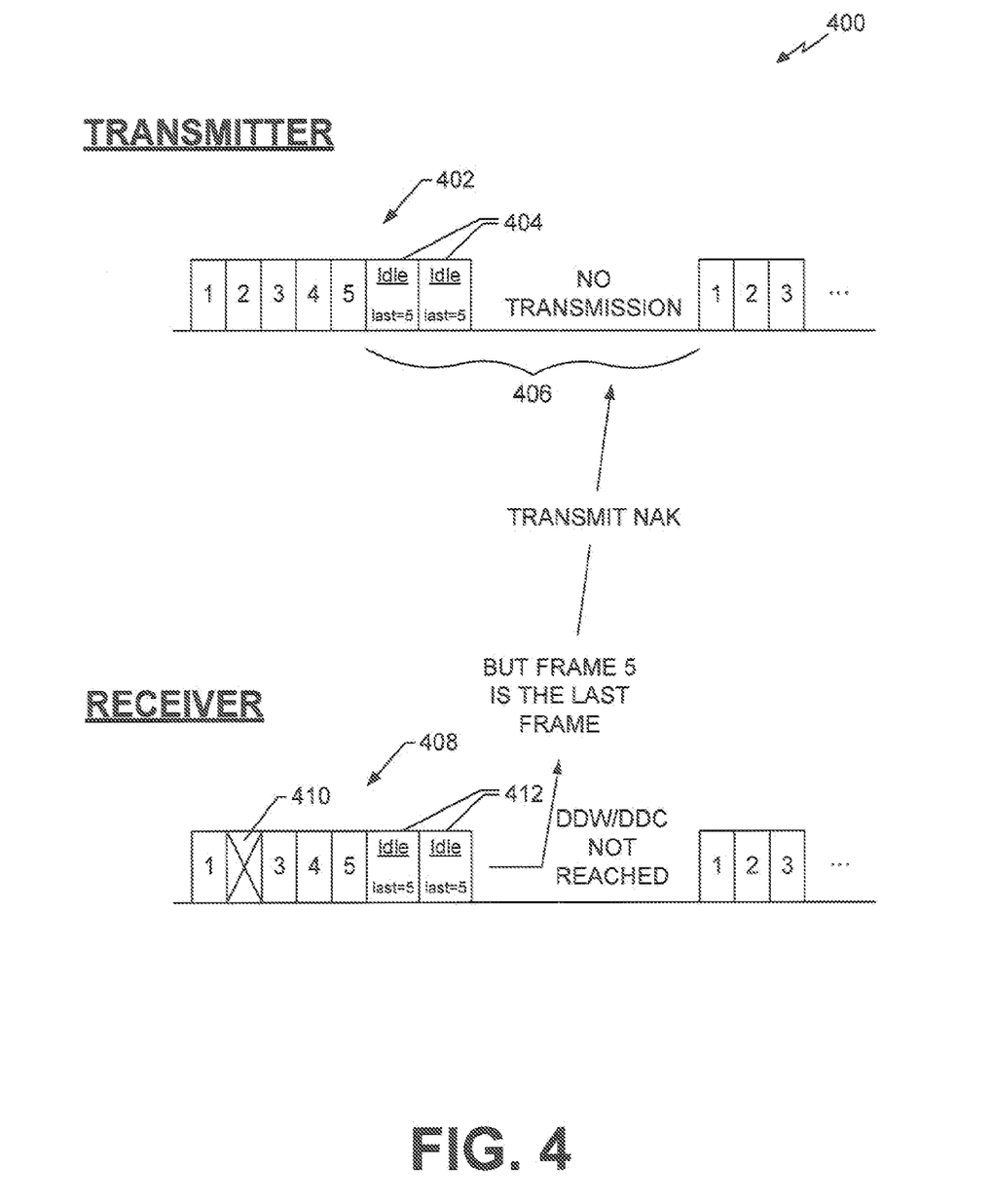
FIG. 4 is an alternative embodiment of the air interface for a packet data application using a DDC implementation.

An alternative embodiment of the air interface 400 for a packet data application using a DDC implementation is illustrated in FIG. 4. In the FIG. 4 alternative embodiment, the data traffic between the Transmitter and the Receiver is "bursty", similar to one embodiment of FIG. 3. Similarly, the data packet 402 in the transmitter side has five RLP frames to be transmitted, followed by a relatively long period 406 of no data transmission. Furthermore, the Transmitter again generates at least one RLP idle frame 404 and incorporates the idle frame to the end of the data packet 402, which indicates that there are no more frames in the RLP buffer to be transmitted. However, in the FIG. 4 alternative embodiment, the idle frame 404 includes additional information that indicates the sequence number of the last frame in the data packet 402. In another alternative embodiment, a number of frames in the group of data frames may be indicated in the idle frame in place of the sequence number of the last frame.

In the FIG. 4 embodiment, when the data packet 402 is transmitted through the transmission medium, and, the content associated with Frame 2 (position 410) is lost, the Receiver receives the data packet 408 and recognizes that, the content associated with Frame 2 (position 410) has not yet been received. The receipt of the idle frame 412 triggers the delay detection counter (for the DDC implementation) and/or the delay detection timer (for the DDW implementation). However, in this case, the Receiver will determine that there are only five RLP frames in the data packet because the information in the idle frame 412 includes the sequence number of the last frame in the data transmission and therefore indicates the last frame that was transmitted. Since the Receiver knows that there were only five frames transmitted in the data packet 408, and the Receiver knows that some of these frames have already been received, it also expects that the missing frame 410 should be received within a relatively short period of time (typically less than the time for the count to reach the DDC). The idle frame may be repeated in the data transmission more than once to ensure that the information in the frame will be received at the Receiver even if one or more of the idle frames are lost.

Accordingly, once the idle frame 412 is received, the Receiver checks a NAK list to determine all NAK messages whose round count (i.e. the number of times the NAK messages have been sent) is equal to zero. For all NAK messages with a round count (e.g. ROUND_COUNT) equal to zero, the following actions may be taken prior to sending the NAK messages. For the DDC implementation, the Receiver may set a delay detection counter to a smaller number (e.g. one in this case because four frames were already received) than the DDC count. For the DDW implementation, the Receiver may set a delay timer to a significantly smaller value than the DDW value, to await the arrival of Frame 2 (position 410) before sending the NAK message.

In a further embodiment, the Receiver may implement a combination of DDC and DDW. For example, in the combined implementation, the delay detection counter may be set to a number ($\delta$) smaller than the DDC count, and a delay timer may be set to a value ($\Delta$) smaller than the DDW value, once the idle frame has been received. If the delay counter value is not reached within the newly-set timer value ($\Delta$), the NAK message may then be sent immediately to request a retransmission of a missing frame.

In one embodiment, the value $\Delta$ may be set to an average maximum time (T) that the physical layer would take to clear frames in all sub-channels weighted by a Quality of Service (QoS) factor, q. Thus, $\Delta = q*T$. The value $\delta$ may be set to an average number of frames delivered by the physical layer before all pending sub-channels are transmitted.

In another alternative embodiment, the RLP link layer queries the physical layer (PDCH), through the media access (MAC) layer, as to whether buffers in all sub-channels of the physical layer do not contain data for that particular service. In practice, this is implemented by querying the Multiplex Sublayer (see FIG. 7) to determine if the sublayer has pending RLP packets for that RLP instance. When the sublayer has no pending RLP packets for that RLP instance, meaning that the buffers in all sub-channels of the physical layer do not contain data for that particular service, the RLP may insert a parameter, such as an extra bit (referred to as a FLUSH bit), in the idle frame. Thus, in this embodiment, when the FLUSH bit is set to one, there are no more frames to be transmitted, and thus, the Receiver may immediately send the NAK message for the missing frame. Furthermore, if the FLUSH bit is set to one, the parameters $\delta$ and $\Delta$ may be set to zero.

Table 1 shows RLP performance numbers where the numbers were generated using a traffic model with 20 Kb sent on top of RLP every 2 seconds for one user at 3 km/h. The column "DDW" represents the baseline case where the NAK messages are sent only when the timer expires, that is after 1200 ms. The column "DDW-Idle" represents numbers generated using the idle frame information to reduce the timer to 100 ms for all pending NAK messages in the first round without setting the FLUSH bit. The column "DDW-Idle-FLUSH" represents numbers generated using the Idle frame in which the FLUSH bit is set when possible. According to this embodiment, three idle frames are sent at most. They are spaced by at least 20 ms. The following statistics are then collected. The time unit is 1 PDCH time slot, i.e., in the current example, 1.25 ms.

1. NAK/L_SEQ: This represents the percentage of NAKs sent per sequence number delivered and is calculated as the total number of NAKs sent/number of sequence numbers delivered. Putting this number in relation to the PL FER gives an idea of how many premature NAKs are sent. It is also useful to know how many, if any, NAKS the RLP has to send.
2. Packet delay: This is the time for an RLP sequence number to go through to delivery of the frame. In case the original frame is lost, this is the time between the creation of original frame until delivery of retransmitted frame.
3. Time in reordering buffer: This is the time spent in the RLP reordering buffer (for packets that go in this buffer). In other words, the in-sequence delivered frames (frames wherein the data content is received in the expected sequence) are not taken into account.
4. RLP throughput (to upper layer): For this calculation only correct bits are taken into account, not aborts.

5. PL throughput to upper layer; This represents the good throughput or "gooput."
6. RLP Bit Error Rate (BER): This determines the RLP bit error rate as a ratio of RLP bits in error compared to all bits transmitted.
7. Physical layer Packet error rate (PER): This is considered after all sub packets are sent.

Table 1 indicates that by incorporating the number of frames included in a transmitted data packet and a parameter, such as a FLUSH bit, into the idle frame, the packet delay may be significantly reduced and the RLP throughput significantly increased.

TABLE 1

RLP Performance

|  | DDW | DDW with Δ = 100 ms | DDW with flush in Idle frames |
|---|---|---|---|
| NAK/L_SEQ delivered [%] | 2.09 | 2.19 | 2.14 |
| Packet delay [Slots] | | | |
| Mean | 325.53 | 118.12 | 90.02 |
| Variance | 538.89 | 273.51 | 234.57 |
| Maximum | 2363.00 | 2727.00 | 2259.00 |
| Time in reordering buffer [Slots] | | | |
| Mean | 793.89 | 282.66 | 216.44 |
| Variance | 580.96 | 379.47 | 340.77 |
| Maximum | 2239.00 | 2229.00 | 2234.00 |
| RLP tput [Kb/s] | 9.98 | 9.99 | 9.99 |
| PL goodput [Kb/s] | 12.07 | 12.07 | 12.08 |
| RLP BER [%] | 0.16 | 0.14 | 0.13 |
| PL PER [%] | 2.50 | 2.54 | 2.53 |

Figure 5:
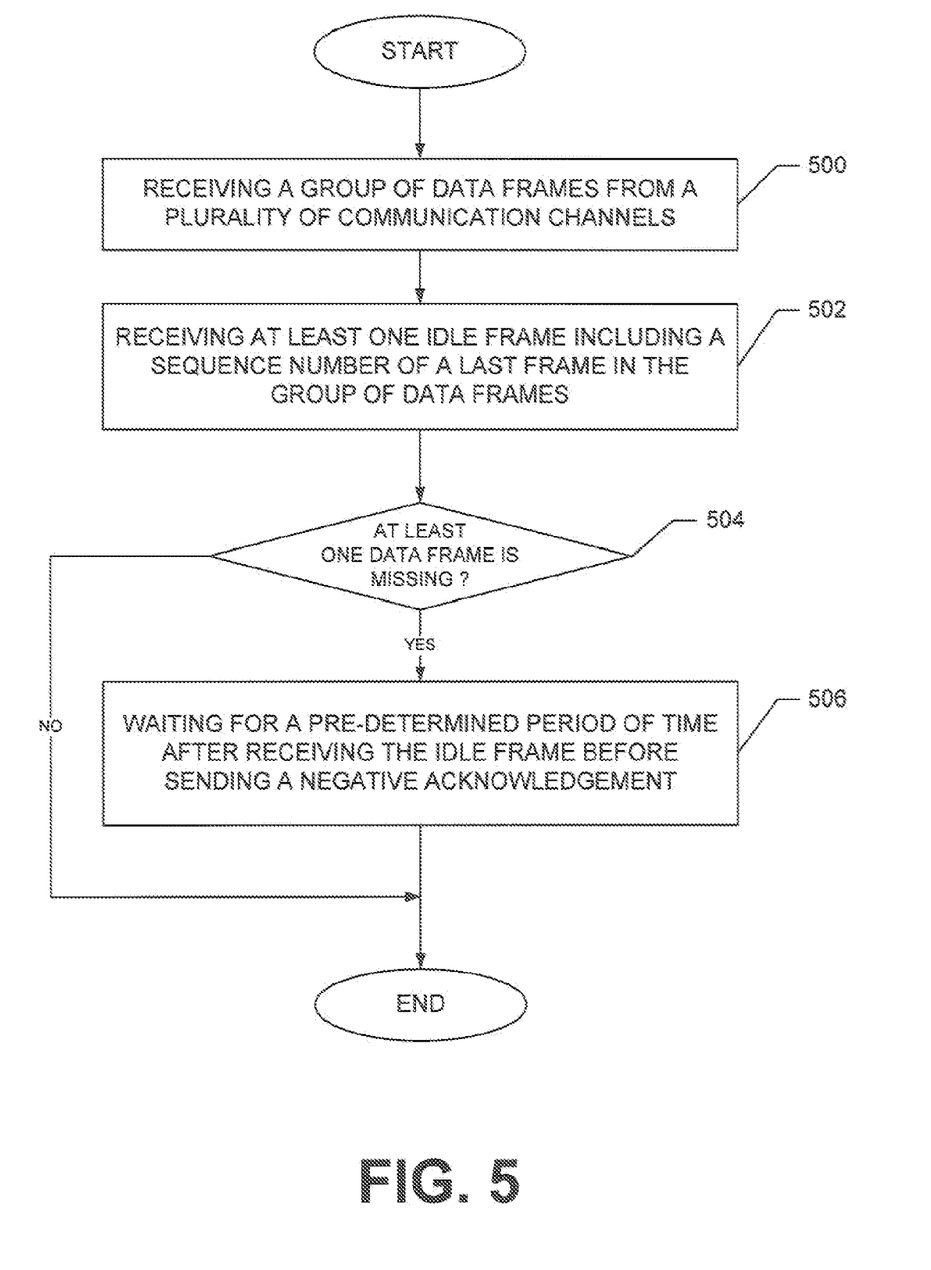
FIG. 5 is a flowchart illustrating a method for early transmission of a negative acknowledgement (NAK) message of a frame receipt in accordance with one embodiment.

FIG. 5 is a flowchart illustrating system operation processes for early transmission of a NAK message of a frame receipt in accordance with one embodiment. A group of data frames is received from a plurality of communication channels, at box 500. At box 502, at least one idle frame including a sequence number of a last frame in the group of data frames is received. At box 504, if it is determined that at least one data frame is missing, then a delay period of time is allowed to elapse after receiving the idle frame before transmitting a NAK message, which is transmitted at box 506. In an alternative embodiment, a number of frames in the group of data frames may be indicated in the idle frame, in place of the sequence number of the last frame.

In one embodiment, the delay period of time is determined by a timer, which is set to a time value that is smaller than a value set for DDW. In another embodiment, the delay period of time is determined by a data frame counter, which is set to a count that is smaller than a count set for DDC. In a further embodiment, the NAK message is transmitted immediately upon receipt of the idle frame if a parameter in the idle frame indicates that buffers in all sub-channels of the physical layer do not contain data for that particular service.

Although the operations or procedures described for early transmission of a NAK message of a frame receipt were presented in a particular sequence, the operations/procedures may be interchanged without departing from the scope of the invention.

Figure 6:
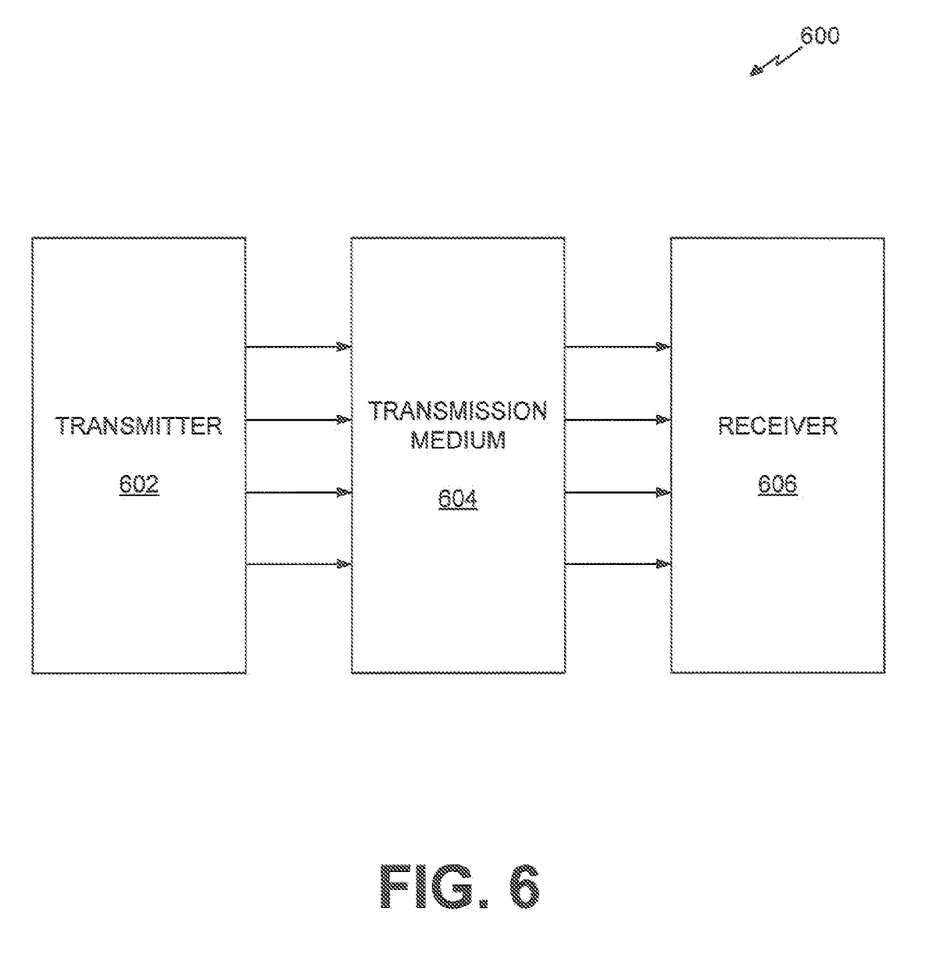
FIG. 6 is a wireless communication system in accordance with an embodiment of the invention.

FIG. 6 is a block diagram of a wireless communication system 600 constructed in accordance with an embodiment of the invention. The system 600 includes a transmitter 602 that communicates over a transmission medium 604 including a plurality of packet data channels, and a receiver 606. The transmitter 602 is configured to transmit a group of data frames through the plurality of packet data channels, where each data frame of the group of data frames is placed on a first available channel of the plurality of packet data channels. In one embodiment, the group of data frames forms a data packet having several RLP sub-packets. These RLP sub-packets are transmitted over the communication channels, which include physical layer sub-channels. In a particular embodiment, the physical layer sub-channels are PDCH sub-channels.

The transmitter 602 also transmits at least one idle frame including a sequence number of a last frame in the group of data frames. In one embodiment, the idle frame includes an RLP idle frame transmitted over the PDCH sub-channels. The receiver 606 is configured to receive the group of data frames and the idle frame, such that the data frames and the idle frame allow the receiver to wait for a delay period of time after receiving at least one idle frame before sending a negative acknowledgement message if at least one data frame is missing. In one wireless network implementation, the transmitter 602 is located in a base station and the receiver 606 is located in a wireless remote terminal. However, in other network implementations, the locations may be reversed.

Figure 7:
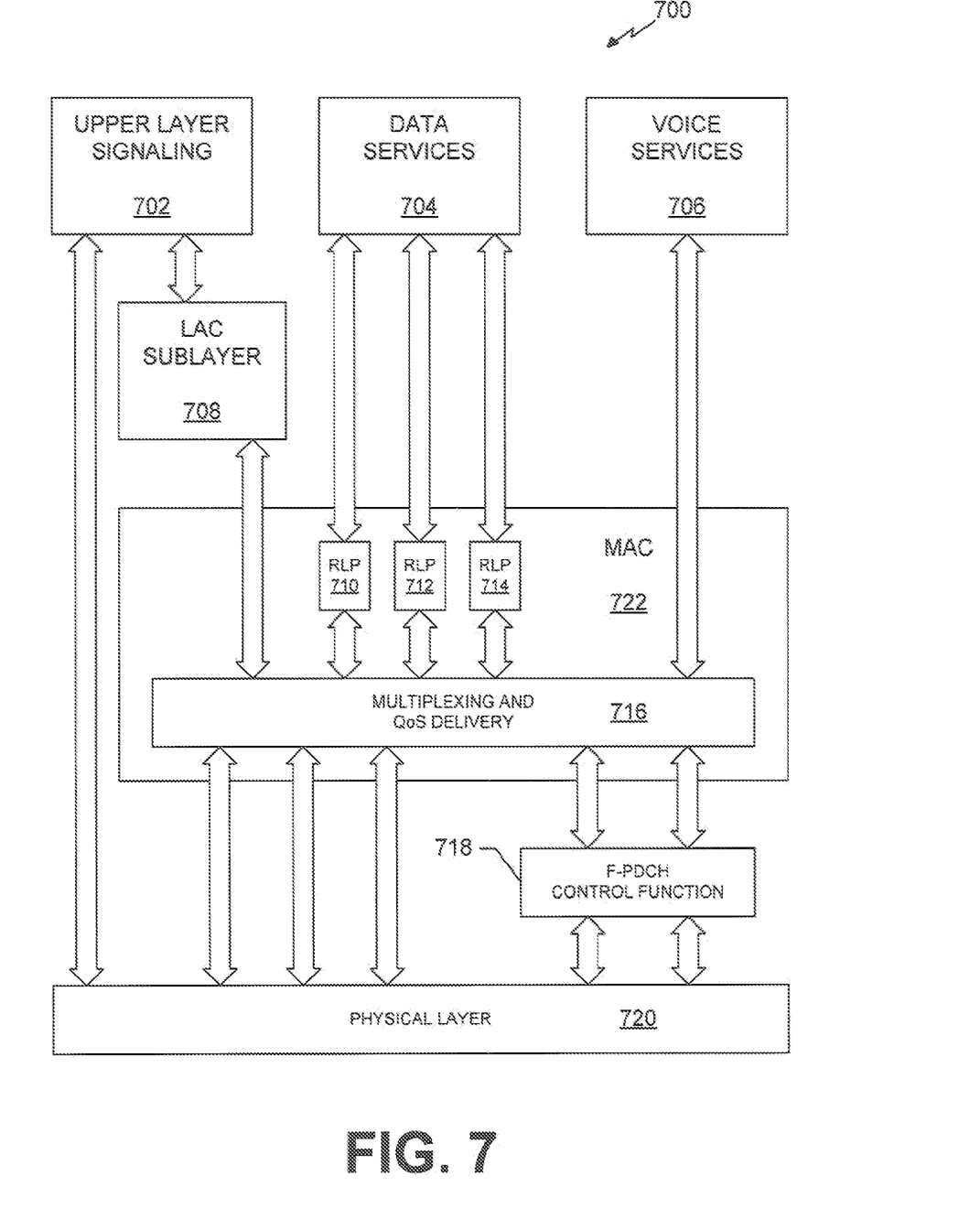
FIG. 7 is an Open System Interconnect (OSI) model block diagram of the general architecture of a wireless network communication system, such as 1xEV-DV, in accordance with one embodiment.

FIG. 7 is an Open System Interconnect (OSI) model block diagram of the general architecture of a wireless network communication system 700, such as 1xEV-DV, in accordance with one embodiment. The OSI model defines layers in a network operating system. For example, an upper layer signaling block 702, a data services block 704, and a voice services block 706, define upper OSI layers (e.g. OSI layers 3-7); a link access control (LAC) sublayer block 708, a media access control (MAC) sublayer block 722, and a PDCH control block 718, define OSI layer 2; and a physical layer 720 defines OSI layer 1. The MAC sublayer block 722 includes Radio Link Protocol (RLP) blocks 710, 712, 714 and a multiplexing and quality of service (QoS) delivery block 716.

In operation, the RLP blocks 710, 712, 714 interface with an operating system of the data services block 704 to generate, assemble, and transfer data packets to the physical layer block 720 for transmission, receipt, and retransmission of the packets through the transmission medium. The control of the packet transmission from the physical layer 720 through the sub-channels of the PDCH is performed by the PDCH control function block 718. Further, an RLP block 710, 712, or 714 that handles the NAK messages interfaces with the physical layer 720 through the multiplexing block 716 to maintain the FLUSH bit according to the status of the buffers in the PDCH sub-channels.

Figure 8:
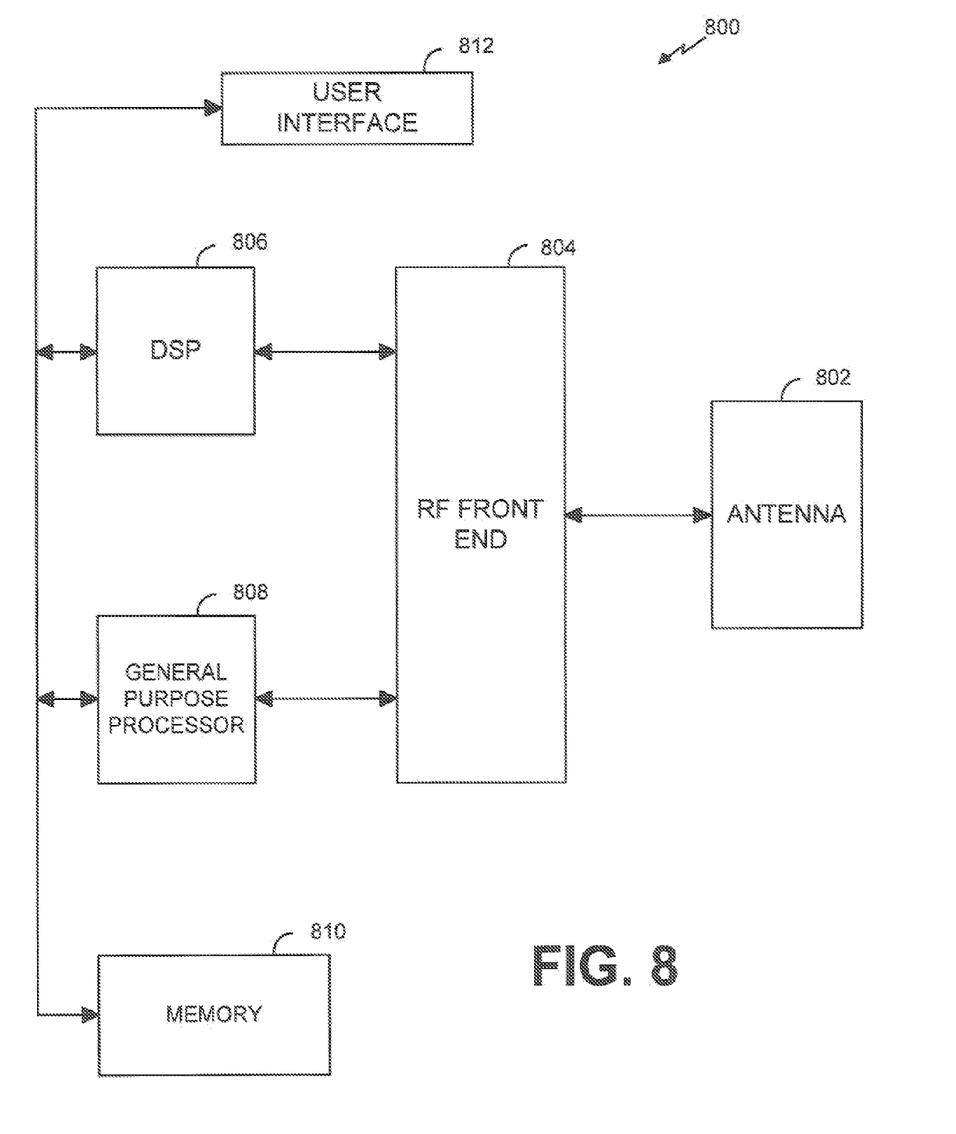
FIG. 8 is a block diagram of an wireless remote terminal constructed in accordance with the present invention.

FIG. 8 is a block diagram of a wireless remote terminal 800 constructed in accordance with the present invention. The remote terminal 800 includes an antenna 802, a radio frequency (RF) front end 804, a digital signal processor (DSP) 806, a general purpose processor 808, a memory device 810, and a user interface 812 such as a display device for providing a graphical user interface.

In accordance with the processing described above, the antenna 802 receives data signals from one or more base station transmitters that were transmitted through a plurality of physical layer sub-channels. The data signals are appropriately amplified, filtered and otherwise processed by the RF front end 804. The output from the RF front end 804 is then applied to the DSP 806. The DSP 806 decodes the received data signals into the data packets that were transmitted from the transmitter. The General Purpose Processor 808 is coupled to the DSP 806 and to the memory 810. The General Purpose Processor 808 receives the data signals and processes the signals into a plurality of frames. The signal also includes at least one idle frame inserted after the last frame of a data transmission that includes a sequence number of the last frame in the plurality of frames. The RF front end 804 processes the reverse link output signal and couples the reverse link output signal to the antenna for transmission to each base station transceiver capable of receiving the signal.

Figure 9:
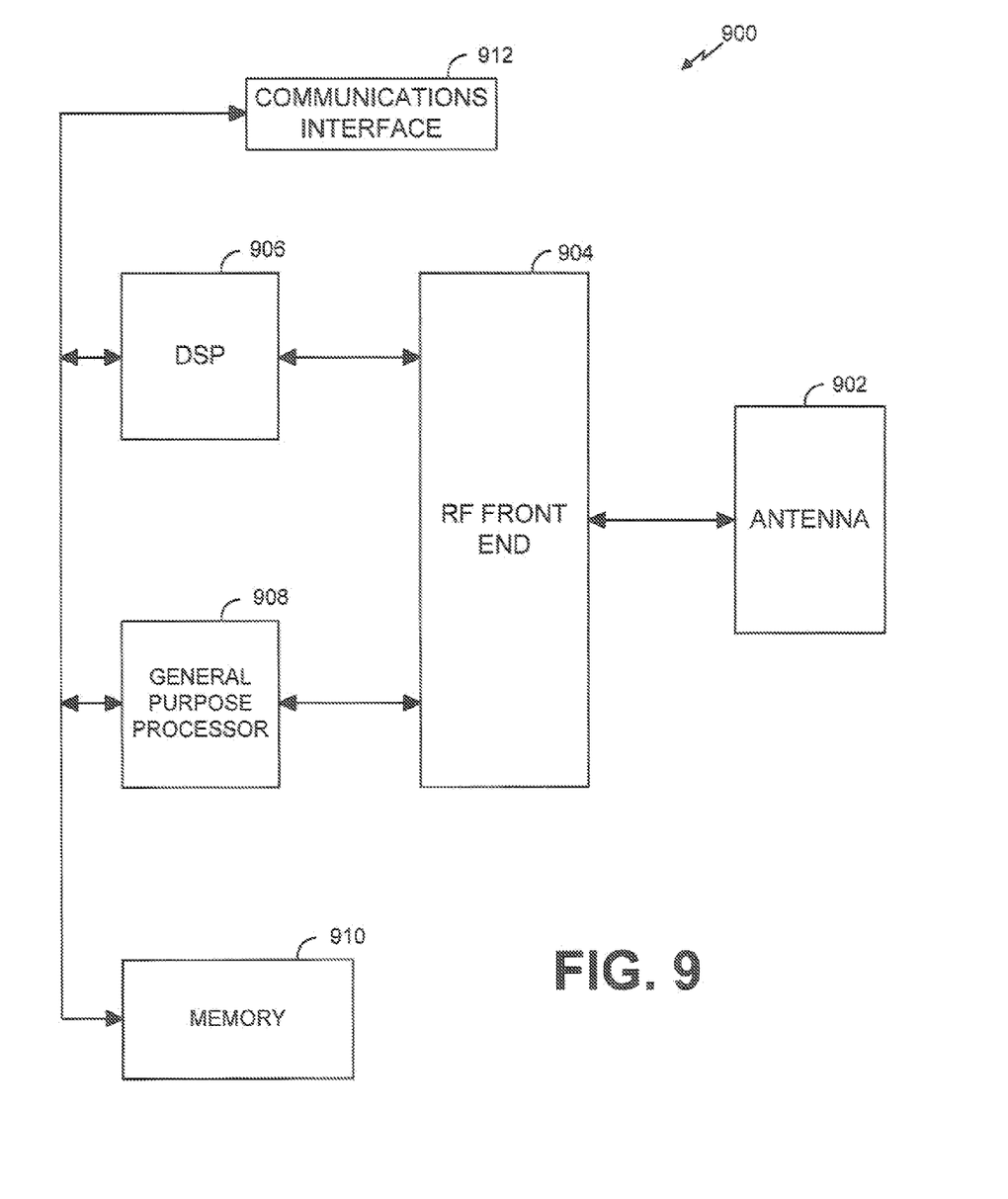
FIG. 9 is a block diagram of a base station in accordance with one embodiment of the present invention.

FIG. 9 is a block diagram of a base station 900 in accordance with one embodiment of the present invention. The base station 900 includes a transceiver, such as an antenna 902 and a radio frequency (RF) front end 904. The base station 900 further includes a digital signal processor (DSP) 906, a general purpose processor 908, a memory device 910, and a communication interface 912.

In one embodiment, the antenna 902 receives reverse link signals that have been transmitted from nearby wireless remote terminals 800. The antenna couples these received signals to an RF front end 904 which filters and amplifies the signals. The signals are coupled from the RF front end 904 to the DSP 906 and to the general purpose processor 908 for demodulation, decoding, further filtering, etc.

The general purpose processor 908 generates and assembles the data packet, including a plurality of data frames and at least one idle frame. The idle frame includes a sequence number of the last frame in the plurality of data frames. The idle frame may also include a parameter, such as a FLUSH bit, that indicates that buffers in all sub-channels of the physical layer do not contain data for that particular service. Thus, the parameters in the idle frame are used to enable early transmission of NAK messages after the idle frame has been received. The RF front end couples the signal to the antenna 902, which transmits the forward link signal to the wireless remote terminal.

Those of skill in the art will understand that information and signals may be represented using any of a variety of different technologies and techniques. For example, data, instructions, commands, information, signals, bits, symbols, and chips that may be referenced throughout the above description may be represented by voltages, currents, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The method or technique described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. One embodiment includes a storage medium coupled to the processor such that the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method implementable by an apparatus, comprising:
receiving, by the apparatus, a group of data frames from a plurality of Packet Data Channel (PDCH) sub-channels, wherein the data frames are assembled from a Radio Link Protocol (RLP) data packet and wherein the data frames, when ordered according to a proper sequence, comprise a data transmission;
receiving at least one idle frame including information about the group of data frames and another parameter, wherein the another parameter is set if all buffers in the plurality of PDCH sub-channels do not contain RLP data to be transmitted; and
immediately sending a negative acknowledgement (NAK) message after receiving the at least one idle frame if at least one data frame is missing and the another parameter is set.

2. The method of claim 1, wherein the information about the group of data frames includes the sequence number of the last frame in the group of data frames.

3. The method of claim 1, further comprising:
generating the RLP data packet.

4. The method of claim 3, further comprising:
providing the plurality of PDCH sub-channels; and
transmitting the group of data frames on the PDCH sub-channels.

5. An apparatus for wireless communications comprising:
a plurality of Packet Data Channel (PDCH) sub-channels configured to receive frames of a data packet arranged in accordance with a Radio Link Protocol (RLP) and at least one idle frame appended to one end of the data packet, the idle frame including information about the frames and another parameter,
wherein the another parameter is set if all buffers in the plurality of PDCH sub-channels do not contain RLP data to be transmitted; and
a scheduler adapted to determine when to send a negative acknowledgement (NAK) message in response to receiving the at least one idle frame, wherein the scheduler immediately sends the NAK message after receiving the at least one idle frame if at least one data frame is missing and the another parameter is set.

6. An apparatus, comprising:

means for receiving a group of data frames from a plurality of Packet Data Channel (PDCH) sub-channels, wherein the data frames are assembled from a Radio Link Protocol (RLP) data packet, and wherein the data frames, when ordered according to a proper sequence, comprise a data transmission;

means for receiving at least one idle frame including information about the group of data frames and another parameter, wherein the another parameter is set if all buffers in the plurality of PDCH sub-channels do not contain RLP data to be transmitted; and means for immediately sending a negative acknowledgement (NAK) message after receiving the at least one idle frame if at least one data frame is missing and the another parameter is set.

7. An apparatus for wireless communications comprising:

a processor configured to assemble a group of data frames and an idle frame; and a transmitter configured to transmit the group of data frames and the idle frame to a remote apparatus, wherein 1) the group of data frames is transmitted through a plurality of Packet Data Channel (PDCH) sub-channels, 2) the idle frame, which is transmitted during a period when no data frames are being transmitted, includes information about the transmitted group of data frames and a parameter indicating that all buffers in the PDCH sub-channels do not contain data to be transmitted for a particular service, and 3) each data frame of the group of data frames is placed on a first available channel of the plurality of PDCH sub-channels; and a receiver configured to receive a negative acknowledgement (NAK) message sent immediately after the at least one idle frame is received by the remote apparatus if at least one data frame is not received by the remote apparatus and the another parameter is set.

8. The apparatus of claim 7, wherein the group of data frames includes a Radio Link Protocol (RLP) data packet arranged into a plurality of data frames.

9. A base station comprising:

a processor configured to assemble a group of data frames including at least one idle frame; and a front end configured to couple the group of data frames to a transceiver configured to transmit the group of data frames to an apparatus through a plurality of Packet Data Channel (PDCH) sub-channels, wherein the at least one idle frame, which is transmitted by the transceiver during a period when no data frames are being transmitted, includes information about the transmitted group of data frames and a parameter indicating that all buffers in the PDCH sub-channels do not contain data to be transmitted for a particular service, and wherein each data frame of the group of data frames is placed on a first available channel of the plurality of Packet Data Channel (PDCH) sub-channels, and wherein the transceiver is further configured to receive a negative acknowledgement (NAK) message sent immediately after the at least one idle frame is received by the apparatus if at least one data frame is not received by the apparatus and the another parameter is set.

10. A mobile station comprising:

an antenna;

a front end configured to receive, through a plurality of Packet Data Channel (PDCH) sub-channels and via the antenna, transmitted data frames of a data packet arranged in accordance with a Radio Link Protocol (RLP), wherein at least one idle frame is appended to one end of the data packet, the idle frame including information about the transmitted data frames and another parameter, and wherein the another parameter is set if all buffers in the plurality of PDCH sub-channels do not contain RLP data to be transmitted; and a scheduler configured to determine, using the sequence number of the last data frame, when to send a negative acknowledgement (NAK) message in response to receiving the at least one idle frame, wherein the scheduler immediately sends the NAK message after receiving the at least one idle frame if at least one data frame is missing and the another parameter is set.

11. A computer-readable medium encoded with instructions, the instructions when executed by a processor perform a method of receiving data, the method comprising:

receiving a group of data frames from a plurality of Packet Data Channel (PDCH) sub-channels, wherein the data frames are assembled from a Radio Link Protocol (RLP) data packet and wherein the data frames, when ordered according to a proper sequence, comprise a data transmission;

receiving at least one idle frame including information about the group of data frames and another parameter, wherein the another parameter is set if all buffers in the plurality of PDCH sub-channels do not contain RLP data to be transmitted; and immediately sending a negative acknowledgement (NAK) message after receiving the at least one idle frame if at least one data frame is missing and the another parameter is set.

12. A computer-readable medium encoded with instructions, the instructions when executed by a processor to perform a method of transmitting data to a remote apparatus, the method comprising:

assembling a group of data frames and an idle frame; and transmitting the group of data frames and the idle frame, wherein 1) the group of data frames is transmitted through a plurality of Packet Data Channel (PDCH) sub-channels, 2) the idle frame, which is transmitted during a period when no data frames are being transmitted, includes information about the transmitted group of data frames and a parameter indicating that all buffers in the PDCH sub-channels do not contain data to be transmitted for a particular service, and 3) each data frame of the group of data frames is placed on a first available channel of the plurality of PDCH sub-channels; and receiving a negative acknowledgement (NAK) message sent immediately after the at least one idle frame is received by the remote apparatus if at least one data frame is not received by the remote apparatus and the another parameter is set.

13. The method of claim 1, wherein the information about the received group of data frames includes the number of data frames in the data transmission.

14. The method of claim 1, wherein immediately sending a NAK message after receiving the at least one idle frame if at least one data frame is missing and the another parameter is set comprises determining whether all of the data frames of the data transmission were received based on the information in the at least one idle frame.

15. A method for wireless communications implementable by an apparatus comprising:

assembling a group of data frames and an idle frame; and transmitting, from the apparatus, the group of data frames and the idle frame to a remote apparatus, wherein 1) the group of data frames is transmitted through a plurality of Packet Data Channel (PDCH) sub-channels, 2) the idle frame, which is transmitted during a period when no data frames are being transmitted, includes information about the transmitted group of data frames and a parameter indicating that all buffers in the PDCH sub-channels do not contain data to be transmitted for a particular service, and 3) each data frame of the group of data frames is placed on a first available channel of the plurality of PDCH sub-channels; and receiving a negative acknowledgement (NAK) message sent immediately after the at least one idle frame is received by the remote apparatus if at least one data frame is not received by the remote apparatus and the another parameter is set.

16. An apparatus for wireless communications comprising:

means for assembling a group of data frames and an idle frame; and means for transmitting the group of data frames and the idle frame to a remote apparatus, wherein 1) the group of data frames is transmitted through a plurality of Packet Data Channel (PDCH) sub-channels, 2) the idle frame, which is transmitted during a period when no data frames are being transmitted, includes information about the transmitted group of data frames and a parameter indicating that all buffers in the PDCH sub-channels do not contain data to be transmitted for a particular service, and 3) each data frame of the group of data frames is placed on a first available channel of the plurality of PDCH sub-channels; and means for receiving a negative acknowledgement (NAK) message sent immediately after the at least one idle frame is received by the remote apparatus if at least one data frame is not received by the remote apparatus and the another parameter is set.

* * * * *

UNITED STATES PATENT AND TRADEMARK OFFICE
CERTIFICATE OF CORRECTION

| | | |
|---|---|---|
| PATENT NO. | : 7,720,043 B2 | |
| APPLICATION NO. | : 10/301448 | |
| DATED | : May 18, 2010 | |
| INVENTOR(S) | : Meylan et al. | |

It is certified that error appears in the above-identified patent and that said Letters Patent is hereby corrected as shown below:

Column 12, line 46, claim 2: "the sequence number" to read as --a sequence number--

Column 14, line 10, claim 10: "the sequence number" to read as --a sequence number--

Column 14, line 38, claim 12: "processor to perform" to read as --processor perform--

Signed and Sealed this
Nineteenth Day of July, 2011

David J. Kappos
*Director of the United States Patent and Trademark Office*